Patented Jan. 28, 1941

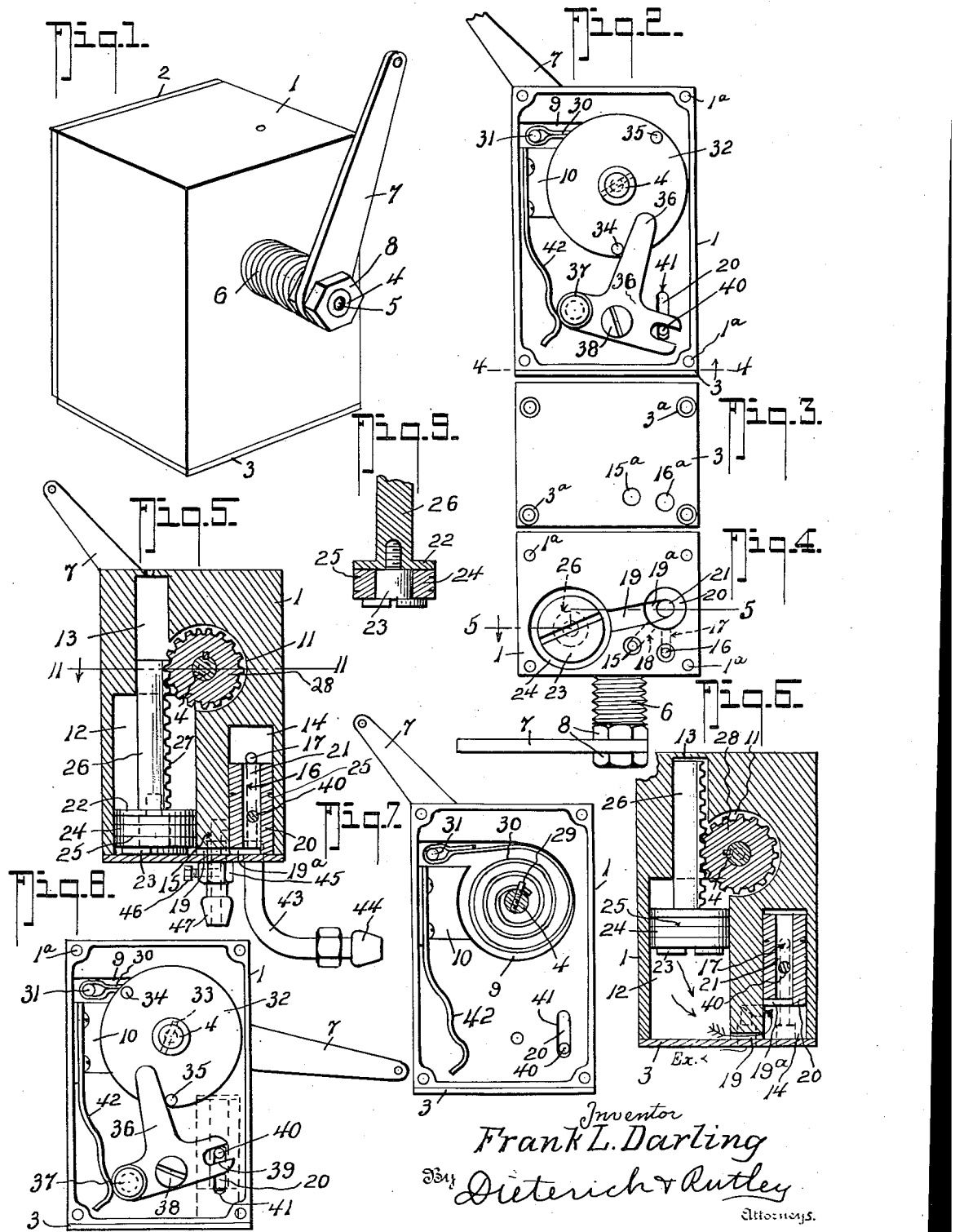

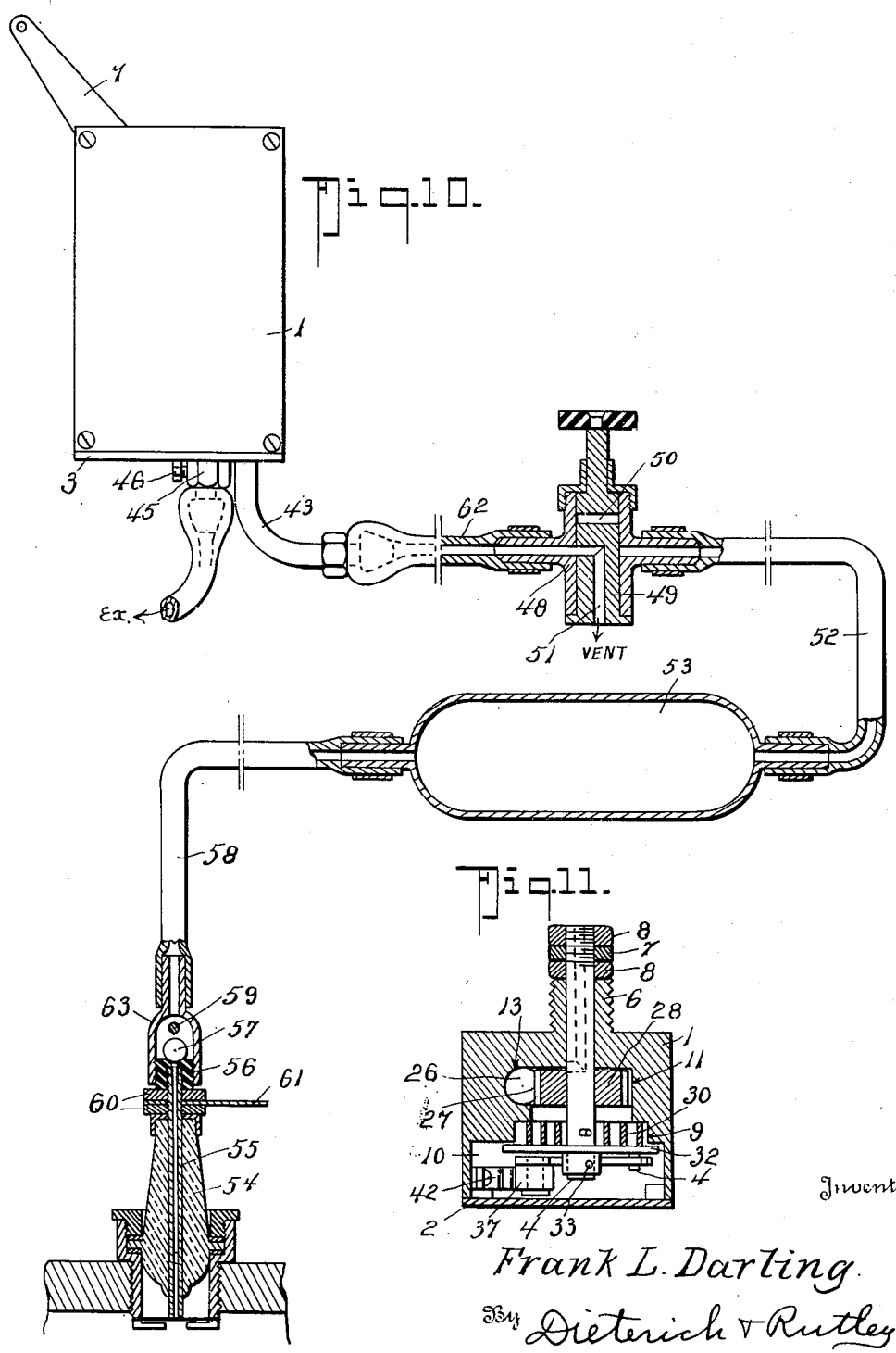

2,229,641

UNITED STATES PATENT OFFICE 2,229,641

WINDSHIELD WIPER MOTOR

Frank L. Darling, Hollywood, Calif.

Application June 2, 1939, Serial No. 277,066

16 Claims. (Cl. 121—164)

My invention relates to the art of windshield wipers and particularly to the motors which actuate the wiping arms. The motors now in general use are of either the vacuum or suction type or of the electric type. The first type is operated through a connection to the intake manifold, while the second mentioned type is operated from the battery.

The principal objection to the vacuum type is that it has relatively little power, which decreases as the engine's throttle is opened wider, sometimes stopping the action of the wiper entirely until the throttle is again partly closed; another objection lies in the relatively large number of parts in its make-up, some of which are quite delicate and frequently require repairs.

The principal objection to the electric type is that it is a drain on the battery of the car; also, if the wiper arm is arrested by snow and ice and the motor is thereby caused to stop, the motor may burn out; also, arcing at the brushes often causes such damage as to necessitate repairs or replacement of the parts.

Furthermore, when the current is cut off, the motor will frequently stop before the wiper blade reaches its normal rest (parked) position; i. e., it will stop wherever the blade happens to be.

My invention has for its object to provide a wiper which is positive in operation at all throttle openings; one that does not depend either on vacuum or suction or on electricity for its motive power, one that comprises but few parts all of which are of rugged construction, will have long life and when necessary can be replaced by unskilled labor, one that can be set up in any desired position on the machine, and one that will have ample power in a motor of small compass. A further object is to provide a motor and means to supply motive fluid to it from the working chamber of the engine without interfering with the smooth running of the engine because of the power taken from a single cylinder.

Other objects will in part be obvious and in part will be pointed out hereinafter.

To the attainment of the above objects and ends the invention still further resides in those novel features of construction, combination and arrangement of parts, all of which will be first fully described in the detailed description and then be particularly pointed out in the appended claims, reference being had to the accompanying drawings, in which:

Fig. 1 is a perspective view of my motor.

Fig. 2 is a rear view of the same with the cover plate removed and the parts at the position corresponding to Fig. 5.

Fig. 3 is a bottom view of the bottom cover.

Fig. 4 is a bottom view of the motor on the line 4—4 of Fig. 2 (i. e., with the bottom cover removed).

Fig. 5 is a vertical section on line 5—5 of Fig. 4, showing the position of the parts in the rest position (ready to operate under power when the throttle valve 49, Fig. 10, is pushed in).

Fig. 6 is a view similar to Fig. 5 with the parts at the end of a power stroke and the power fluid beginning to exhaust.

Fig. 7 is a view similar to Fig. 2 with the parts 32 and 36 removed.

Fig. 8 is a view similar to Fig. 2 but with the parts in the position corresponding to Fig. 7.

Fig. 9 is a detail view later referred to.

Fig. 10 is a view of the motor and its cooperating power-supplying and motor-control mechanisms.

Fig. 11 is a cross section on the line 11—11 of Fig. 5.

In the drawings, in which like numerals of reference designate like parts in all the figures, 1 is the casing body which has an opening in its back that is normally closed by a removable back cover plate 2; it also has a removable bottom cover plate 3. The body 1 has screw holes 1$^a$ and 3$^a$, respectively, for the screws (not shown) which hold the plates 2 and 3 in place.

Mounted in a suitable bearing in the elongated boss 6 is an oscillatable shaft 4 having a lubricant duct 5 and carrying on its outer end an arm 7 to which the usual wiper blade (not shown) is connectible, the arm being secured in any suitable way, as by nuts 8, for instance.

The body 1 has recesses 9 and 10. In the recess 9 is a volute spring (watch spring type) 30, one end of which engages a pin 29 on the shaft 4 and the other end of which is anchored to a pin 31 fixed in the body 1.

The body 1 is also provided with a further recess 11 in which the pinion 28 that is keyed to shaft 4 is located.

12 designates the cylindrical bore for the working piston 22, 23, 24, whose stem 26 works in a bore 13 and has a rack face 27 to mesh with the pinion 28.

The body 1 is also provided with a smaller bore 14 constituting a valve chamber, in which the valve 20 reciprocates, when power is applied. The bores 12 and 14 communicate at one end only (bottom in the drawings) through a cross port 19, the valve 20 having a groove 19$^a$ to register with port 19 when the parts are in the rest position (Figs. 1, 2 and 5). This groove 19ª communicates with the through bore 21 of the valve 20.

Power fluid passes into the valve chamber 14 via duct 16 to port 17 and exhausts from that chamber via port 18 and duct 15 in body 1. Cover 3 has openings 15ª and 16ª to register with ducts 15 and 16, respectively, and to receive the exhaust nipple 45—47 and the intake elbow 43, respectively. The exhaust nipple has a metering screw 46, later again referred to, and the inlet elbow has a head 44.

Mounted on shaft 4 within the rear chamber of the body 1 is a disc 32, pinned to shaft 4 as at 33 (Fig. 8) and carrying two pins 34 and 35, respectively, to cooperate with a rocking T-lever 36, pivoted at 38 and having a roller 37 (to be engaged by a leaf spring 42) and having a fork in whose slot 39 the valve pin 40 works. The pin 40 projects through a slot 41, as shown.

In order to supply a power-applying fluid to the motor, the arrangement shown in Fig. 10 may be employed. By reference to Fig. 10 it will be seen that the elbow 43 is connected by a suitable duct 62 to one side of a push-pull throttle valve in whose casing 48 the valve proper 49 operates. The valve 49 has a cross duct 50 and a vent duct 51 so arranged that when the valve is in one position (pulled out, as shown) duct 62 will be vented to atmosphere, while cross duct 50 will be closed, as will also be the inlet duct of the valve, which inlet duct is connected to the pressure-impulse absorbing chamber 53 by a duct 52.

Power to actuate the motor may be obtained from a working chamber of the engine in any suitable way, as for example, by having an air-compressor of the spark-plug opening fitting type or, as shown in the drawings, a portion of the working mixture may be taken from a cylinder of the engine through a hollow electrode 55 of a spark plug 54 (see Fig. 10). In the latter case the plug 54 has its center electrode 55 provided with a small bore, and to this electrode a Bakelite or other suitable electrical insulator 56 is fastened. To this insulator 56 is secured a fitting 66 containing a back-check valve 57 and a valve stop pin 59, the fitting connecting to duct 58 that conveys the fluid to chamber 53.

Nuts 60 on the electrode 55 enable the ignition wire 61 to be connected to the electrode.

*Operation*

With the throttle 49 pushed way in, metering screw 46 is adjusted so that the shaft 4 will oscillate at the desired rate. Screw 46 is thereafter not used for affecting the operation of the device, all lesser speeds being obtained by virtue of the position of throttle valve 49.

Assume the adjustment to have been made and valve 49 pushed all the way in so that port 50 registers fully with ducts 52 and 62. Power fluid will then pass through spark plug and duct 58 to chamber 53, from thence via duct 52, valve port 50 and duct 62 to elbow 43, and from thence via port 17 into top of valve chamber 14, flowing down through valve bore 21 to ports 19ª—19 into chamber 12 below piston 24 to raise the same. Raising piston 24 causes pinion 28 to turn clockwise in Fig. 5 and wind up spring 30. As pin 35 (Fig. 2) approaches arm 36 it will engage the same and rock the lever to raise valve 20 (to the position of the figures shown in Figs. 6 and 8). In raising, the valve 20 will close port 17 and open port 18, which exhausts chambers 12 and 14 to atmosphere via 45, 46 and permits spring 30 to function to return arm 7 to rest position. As rest position is approached, pin 34 engages arm 36 and rocks the T-lever back to the position of Fig. 2, which lowers valve 20 to close port 18 and open port 17 again, which completes one cycle of operation. If valve 49 is still pushed in, the cycle will be repeated ad infinitum so long as valve 49 remains pushed in.

When valve 49 is pulled out again, chambers 12 and 14 will be vented to atmosphere, regardless of the position of the valve 20 at the instant valve 49 is pulled out, thus ensuring the arm 7 always to return to its rest (sometimes called parked) position.

It will be seen that by properly adjusting valve 46, the piston 22—24 will work, under spring action, against a compressible gas which acts as a pneumatic spring and prevents forceful impact of 23 against 3.

The piston 24 preferably floats on stud 23 so as to allow rack 27 always to mesh freely with pinion 28 and both pistons 24 and 20 may have oil grooves 25.

Any suitable lubrication fitting (not shown) may be screwed into the outer end of shaft 4 to communicate with duct 5, such, for instance as an "Alemite" fitting and duct 5 arranged to deliver the lubricant into recess 11 at a side of pinion 28 (see Fig. 11).

Boss 6 is threaded to receive nuts (not shown) by means of which the motor may be mounted on a motor vehicle in a known way.

In practice I have found that the bore of electrode 55 can be very small and yet sufficient power can be had to operate the motor under all conditions of weather.

While I have shown and described the preferred embodiment of my invention, I wish it understood that changes in details of construction may be made by those skilled in the art without departing from the spirit of the invention and within the scope of the appended claims.

When the wiper is used on motor vehicles having air brakes, compressed air from the brake reservoir can be used as the motive fluid.

From the foregoing description, taken in connection with the accompanying drawings, it is thought that the complete construction, operation and advantages of the invention will be clear to those skilled in the art.

What I claim is:

1. A windshield wiper motor, comprising, in one assembly, a body having a piston chamber and a valve chamber, a piston in said piston chamber, an oscillatable shaft journaled in a bearing in said body, cooperative connections between said piston and said shaft, yieldable means continuously tending to turn said shaft in one direction, a valve in said valve chamber, said body having a port effecting communication between one end of each of said chambers for admission of fluid against said piston to overcome said yieldable means and move said shaft in the opposite direction, means to lead fluid under pressure into said valve chamber, means to exhaust fluid therefrom, said two last named means including inlet and exhaust ports controlled by said valve, means cooperative with said shaft for shifting said valve at the end of each oscillation of said shaft, and an arm on said shaft.

2. A windshield wiper motor comprising, in one assembly, a body having a piston chamber and a valve chamber and an intercommunicating duct between one end only of each of said chambers, an oscillatable shaft journalled in a bearing in said body, a piston in said piston chamber, a valve in said valve chamber, said body having fluid inlet and fluid outlet ports for said valve chamber, which ports are controlled by said valve, a rack carried by said piston and a pinion carried by said shaft and meshing with said piston, means operated by said shaft for effecting operation of said valve alternately to move said piston in one direction and release it free to return in the opposite direction, and yielding means for constantly urging said piston to the limit of its movement in the opposite direction, by virtue of all of which when motive fluid under pressure is applied to the inlet port of said valve chamber the piston will be caused to reciprocate in its chamber and impart oscillations to said shaft continuously while the motive fluid is being admitted to the valve chamber, and an arm on said shaft.

3. A windshield wiper motor, comprising a body having a piston chamber and a valve chamber and an intercommunicating duct between one end of each chamber, an oscillatable shaft journaled in a bearing in said body, means to deliver an operating fluid into and exhaust the same from said valve chamber, said means including an inlet port and an outlet port, a valve in said valve chamber, a piston in said piston chamber, an operative connection between said shaft and said piston, spring means constantly urging said shaft to turn in one direction and said piston to move in one direction, and pneumatic means governed by said valve for moving said piston and shaft in the opposite direction, said pneumatic means comprising a source of gaseous fluid under pressure, a throttle valve to control the flow of fluid to the motor proper, said throttle valve having means to shut off said fluid flow and vent the motor to atmosphere, by virtue of all of which said piston will be caused to reciprocate back and forth continuously so long as said throttle valve is open.

4. A windshield wiper motor, comprising a body having a piston chamber and a valve chamber and an intercommunicating duct between one end of each chamber, an oscillatable shaft journaled in a bearing in said body, means to deliver an operating fluid into and exhaust the same from said valve chamber, said means including an inlet port and an outlet port, a valve in said valve chamber, a piston in said piston chamber, a rack and pinion connection between said shaft and said piston, spring means constantly urging said shaft to turn in one direction and said piston to move in one direction, and pneumatic means governed by said valve for moving said piston and shaft in the opposite direction, said pneumatic means comprising a source of gaseous fluid under pressure, a throttle valve to control the flow of fluid to the motor proper, said throttle valve having means to shut off said fluid flow and vent the motor to atmosphere, by virtue of all of which said piston will be caused to reciprocate back and forth continuously so long as said throttle valve is open.

5. In a windshield wiper motor, a body having a piston chamber, a valve chamber, and a third chamber, and having a shaft bearing, an oscillatable shaft in said bearing, an arm on said shaft outside said body, a pinion on said shaft inside said body, a piston in said piston chamber and having a rack bar meshing with said pinion, a reciprocable valve in said valve chamber, said body having a constantly open intercommunicating duct between one end of said piston chamber and one end of said valve chamber, a coil spring in said body, one end of which is anchored to the body and the other end of which is anchored to said shaft, continuously tending to turn said shaft in one direction, means to deliver power fluid to and exhaust the same from said valve chamber and controlled by said valve for forcing said piston against the action of said spring to turn said shaft in the opposite direction, and means to shift said valve at intervals.

6. In a motor of the class described, a body having a piston chamber, a valve chamber, and a third chamber, and having a shaft bearing, an oscillatable shaft in said bearing, an arm on said shaft outside said body, a pinion on said shaft inside said body, a piston in said piston chamber and having a rack bar meshing with said pinion, a reciprocable valve in said valve chamber, said body having a constantly open intercommunicating duct between one end of said piston chamber and one end of said valve chamber, a coil spring in said body, one end of which is anchored to the body and the other end of which is anchored to said shaft, continuously tending to turn said shaft in one direction, means to deliver power fluid to and exhaust the same from said valve chamber and controlled by said valve for forcing said piston against the action of said spring to turn said shaft in the opposite direction, a disc on said shaft and having spaced pins, and a rocking lever engageable by said pins alternately and connected with said valve for shifting said valve at predetermined intervals.

7. In a motor of the class described, a body having a piston chamber, a valve chamber, and a third chamber, and having a shaft bearing, an oscillatable shaft in said bearing, an arm on said shaft outside said body, a pinion on said shaft inside said body, a piston in said piston chamber and having a rack bar meshing with said pinion, a reciprocable valve in said valve chamber, said body having a constantly open intercommunicating duct between one end of said piston chamber and one end of said valve chamber, a coil spring in said body, one end of which is anchored to the body and the other end of which is anchored to said shaft, continuously tending to turn said shaft in one direction, means to deliver power fluid to and exhaust the same from said valve chamber and controlled by said valve for forcing said piston against the action of said spring to turn said shaft in the opposite direction, means to shift said valve at intervals, and means to establish a pneumatic cushion against which said piston is forced by said spring.

8. In a motor of the class described, a body having a piston chamber, a valve chamber, and a third chamber, and having a shaft bearing, an oscillatable shaft in said bearing, an arm on said shaft outside said body, a pinion on said shaft inside said body, a piston in said piston chamber and having a rack bar meshing with said pinion, a reciprocable valve in said valve chamber, said body having a constantly open intercommunicating duct between one end of said piston chamber and one end of said valve chamber, a coil spring in said body, one end of which is anchored to the body and the other end of which is anchored to said shaft, continuously tending to turn said shaft in one direction, means to deliver power fluid to and exhaust the same from said valve chamber and controlled by said valve for forcing said piston against the action of said spring to turn said shaft in the opposite direction, a disc on said shaft and having spaced pins, and a rocking lever engageable by said pins alternately and connected with said valve for shifting said valve at predetermined intervals, and means to establish a pneumatic cushion against which said piston is forced by said spring.

9. In motor of the class described, a body having a piston chamber, a valve chamber, and a third chamber, and having a shaft bearing, an oscillatable shaft in said bearing, an arm on said shaft outside said body, a pinion on said shaft inside said body, a piston in said piston chamber and having a rack bar meshing with said pinion, a reciprocable valve in said valve chamber, said body having a constantly open intercommunicating duct between one end of said piston chamber and one end of said valve chamber, a coil spring in said body, one end of which is anchored to the body and the other end of which is anchored to said shaft, continuously tending to turn said shaft in one direction, means to deliver power fluid to and exhaust the same from said valve chamber and controlled by said valve for forcing said piston against the action of said spring to turn said shaft in the opposite direction, means to shift said valve at intervals, and means to establish a pneumatic cushion against which said piston is forced by said spring, said last named means comprising a metering screw in the exhaust delivering means by which the rapidity of the exhausting may be regulated.

10. A motor of the class described, comprising a body having a piston chamber and a valve chamber and an intercommunicating duct between one end of each chamber, an oscillatable shaft journaled in a bearing in said body, means to deliver an operating fluid into and exhaust the same from said valve chamber, said means including an inlet port and an outlet port, a valve in said valve chamber, a piston in said piston chamber, an operative connection between said shaft and said piston, means constantly urging said shaft to turn in one direction and said piston to move in one direction, pneumatic means governed by said valve for moving said piston and shaft in the opposite direction, and means to vent said piston chamber when the pneumatic means is cut off.

11. A motor of the class described, comprising a body having a piston chamber and a valve chamber and an intercommunicating duct between one end of each chamber, an oscillatable shaft journaled in a bearing in said body, means to deliver an operating fluid into and exhaust the same from said valve chamber, said means including an inlet port and an outlet port, a valve in said valve chamber, a piston in said piston chamber, a rack and pinion connection between said shaft and said piston, spring means constantly urging said shaft to turn in one direction and said piston to move in one direction, pneumatic means governed by said valve for moving said piston and shaft in the opposite direction, said piston comprising a fixed member and a floating member, and means to hold said fixed and floating members assembled.

12. A motor of the class described, comprising a body having a piston chamber and a valve chamber and an intercommunicating duct between one end of each chamber, an oscillatable shaft journaled in a bearing in said body, means to deliver an operating fluid into and exhaust the same from said valve chamber, said means including an inlet port and an outlet port, a valve in said valve chamber, a piston in said piston chamber, an operative connection between said shaft and said piston, spring means constantly urging said shaft to turn in one direction and said piston to move in one direction, pneumatic means governed by said valve for moving said piston and shaft in the opposite direction, by virtue of all of which said piston will be caused to reciprocate back and forth continuously so long as said pneumatic means is operative, and means to vent said piston chamber when said pneumatic means is inoperative, by virtue of which said piston will always return to a normal, parked, position.

13. In a windshield wiper motor or the like, a body having a piston chamber and a valve chamber and an intercommunicating duct between said chambers, an oscillatable shaft journaled in a bearing in said body, means to convey a fluid into and to exhaust the same from said valve chamber, said means including an inlet port and an outlet port, and a valve in said valve chamber constructed to admit fluid under pressure periodically into and exhaust same from said piston chamber, a piston in said piston chamber, an operative connection between said shaft and said piston, and spring means constantly urging said shaft to turn in a direction to park the wiper when said fluid is inactive, by virtue of all of which said piston will be caused to reciprocate back and forth to oscillate said shaft continuously so long as the fluid is admitted to said valve chamber.

14. A windshield wiper motor comprising, in one assembly, a body having, in communication at one end, a piston chamber and a valve chamber enclosed within the body, a valve in said valve chamber, a piston in said piston chamber, said body having a piston rod guide way, a piston rod projecting into said guideway, an oscillatable shaft journalled in a bearing in said body, said piston rod having a rack, a pinion on said shaft engaging said rack, a disc on said shaft within said body and having spaced pins, a rocker pivoted in said body and cooperating with said pins and with said valve, yieldable means mounted in said body for giving a snap action to said rocker when the same shall have been actuated by said pins, spring means constantly urging said piston in one direction, and means to admit fluid under pressure to said valve chamber for moving said piston in opposition to said spring, by virtue of all of which so long as fluid under pressure is supplied to said valve chamber, said piston will be caused to reciprocate back and forth continuously, and combined with means to bleed the piston chamber and valve chamber when the supply of fluid under pressure is stopped so as to enable said piston to return always to a parked or predetermined position.

15. A windshield motor comprising, in one assembly, a body having a piston chamber and a valve chamber one end of each chamber opening through one end of the body, a removable cover at said end of the body for said chambers, said body having a duct to effect communication between one end of said valve chamber and one end of said piston chamber, an oscillatable shaft journalled in a bearing in said body, a piston in said piston chamber, a rack and pinion connection between said piston and said shaft, said body having an inlet port to said valve chamber for fluid under pressure and having an outlet port for spent fluid from the piston chamber via the valve chamber to atmosphere, a valve in said valve chamber for controlling said inlet and outlet ports, resilient means continuously tending to turn said shaft in one direction, and means actuated by the oscillating of said shaft for shifting said valve at the end of each stroke or said piston.

16. In a windshield wiper motor or the like, a body having two parallel bores entering the body at the bottom, one of said bores constituting a piston chamber and the other constituting a valve chamber, a cap closing the entrant ends of said chambers, a piston in the piston chamber, and a valve in the valve chamber, a duct between the entrant ends of said chambers, said body having a fluid inlet port and an exhaust port for the valve chamber, which ports are controlled by said valve, said body having a piston-rod receiving recess, a piston rod carried by said piston and projecting into said recess, a shaft journalled in bearings in said body, rack and pinion connections between said piston rod and said shaft, a spring constantly urging said shaft to turn in one direction to a return position, the weight of said piston and its piston rod tending to return the piston to a definite return position, thereby augmenting the action of the spring, and an arm on said shaft.

FRANK L. DARLING.